United States Patent
Ushijima

(10) Patent No.: US 9,709,874 B2
(45) Date of Patent: Jul. 18, 2017

(54) DEVICE AND METHOD FOR IMAGE PROCESSING USED FOR TRACKING PURSUED SUBJECT

(71) Applicant: FUJITSU LIMITED, Kawasaki-shi (JP)

(72) Inventor: Satoru Ushijima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 811 days.

(21) Appl. No.: 13/667,259

(22) Filed: Nov. 2, 2012

(65) Prior Publication Data

US 2013/0057701 A1    Mar. 7, 2013

Related U.S. Application Data

(63) Continuation of application No. PCT/JP2010/057903, filed on May 10, 2010.

(51) Int. Cl.
*G06K 9/46* (2006.01)
*G06T 7/11* (2017.01)
(Continued)

(52) U.S. Cl.
CPC ............ *G03B 13/36* (2013.01); *G03B 15/00* (2013.01); *G06K 9/46* (2013.01); *G06T 7/11* (2017.01);
(Continued)

(58) Field of Classification Search
CPC .... G03B 13/36; G03B 15/00; H04N 5/23212; H04N 5/23293; H04N 5/232; G06T 7/0081; G06T 2207/20148; G06T 2207/20141; G06T 7/2033; G06T 2207/10016; G06T 5/001; G06T 7/20; G01S 3/7864; G01S 3/7865; G06K 9/4609; G06K 9/6203;
(Continued)

(56) References Cited

U.S. PATENT DOCUMENTS

| | | | | |
|---|---|---|---|---|
| 5,631,697 A | * | 5/1997 | Nishimura | G01S 3/7865 348/170 |
| 2003/0169340 A1 | * | 9/2003 | Kamijo | G06K 9/00785 348/169 |

(Continued)

FOREIGN PATENT DOCUMENTS

| | | |
|---|---|---|
| JP | 7-154666 | 6/1995 |
| JP | 11-114860 | 4/1999 |

(Continued)

OTHER PUBLICATIONS

Machine English Translation of JP 07-154666.*

(Continued)

*Primary Examiner* — Mohammed Jebari
(74) *Attorney, Agent, or Firm* — Staas & Halsey LLP

(57) ABSTRACT

An image processing device includes: an extractor configured to extract a region of interest which includes a point of interest and satisfies a specified condition in a first image frame; a divider configured to divide the region of interest into a first subregion including the point of interest and a second subregion not including the point of interest at a narrow portion of the region of interest; and a specifying unit configured to specify a specified pixel in the first subregion as a point of interest of a second image frame.

8 Claims, 17 Drawing Sheets

(51) Int. Cl.
*G03B 13/36* (2006.01)
*G03B 15/00* (2006.01)
*H04N 5/232* (2006.01)
*G06T 7/187* (2017.01)
*G06T 7/136* (2017.01)

(52) U.S. Cl.
CPC .............. *G06T 7/136* (2017.01); *G06T 7/187* (2017.01); *H04N 5/23212* (2013.01); *H04N 5/23293* (2013.01)

(58) Field of Classification Search
CPC .......... G06K 9/20; G06K 9/4604; G06K 9/50; G06K 2209/01; G06K 9/3241; G06K 9/00771; G06K 9/46; G06F 3/04883
See application file for complete search history.

(56) References Cited

U.S. PATENT DOCUMENTS

| | | |
|---|---|---|
| 2005/0254686 A1 | 11/2005 | Koizumi |
| 2006/0092280 A1* | 5/2006 | Kamijo .............. G06K 9/00785 348/169 |
| 2008/0080739 A1 | 4/2008 | Muramatsu |
| 2009/0153666 A1* | 6/2009 | Takeuchi .............. G01S 3/7864 348/169 |

FOREIGN PATENT DOCUMENTS

| | | |
|---|---|---|
| JP | 11-136664 | 5/1999 |
| JP | 2004-96402 | 3/2004 |
| JP | 2004-234132 | 8/2004 |
| JP | 2008-113423 | 5/2008 |
| JP | 2008-298706 | 12/2008 |

OTHER PUBLICATIONS

International Search Report of Corresponding PCT Application PCT/JP2010/057903 mailed Aug. 10, 2010.
English translation of International Preliminary Report on Patentability mailed Dec. 10, 2012 for corresponding International Application No. PCT/JP2010/057903.

* cited by examiner

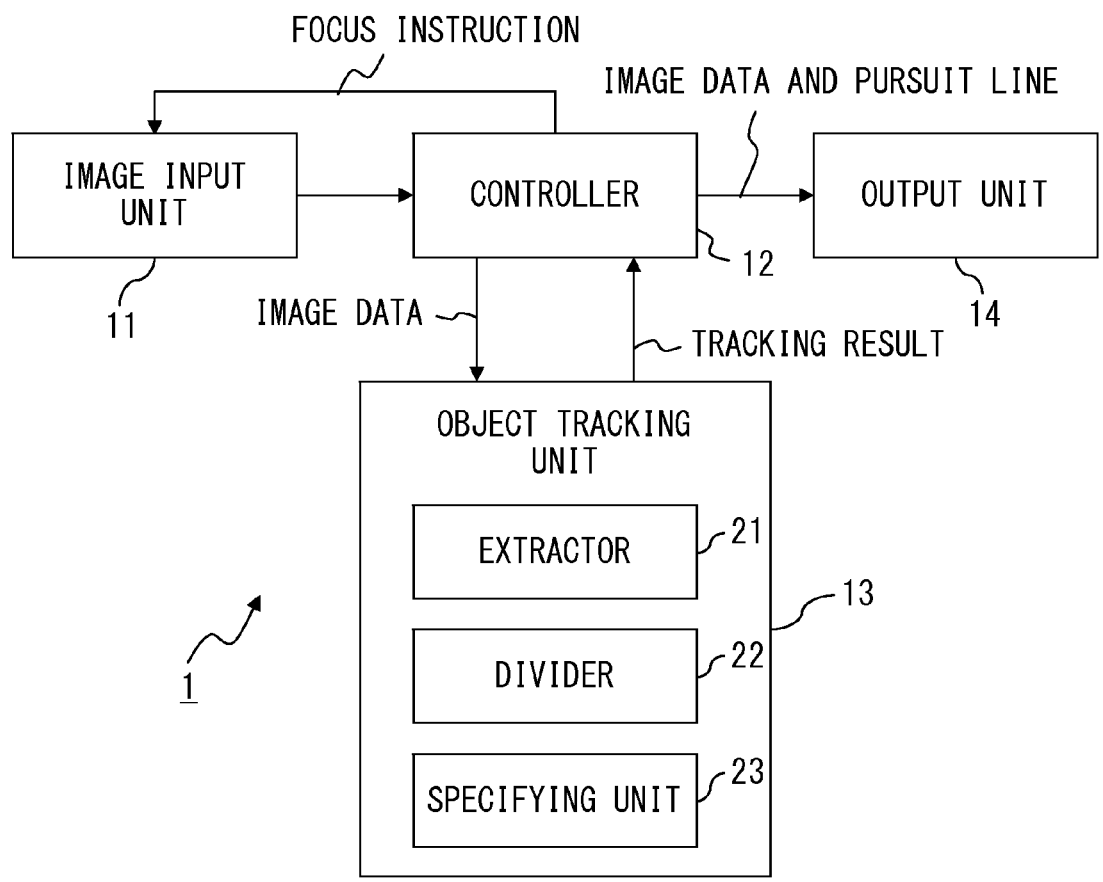
F I G. 1

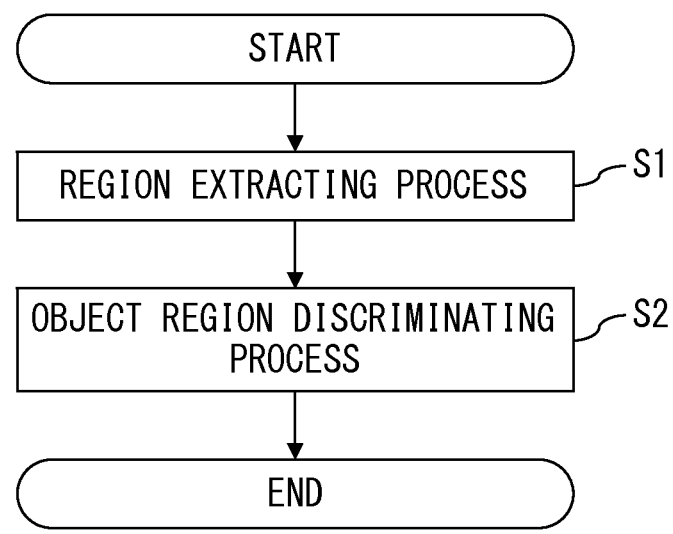
F I G. 3

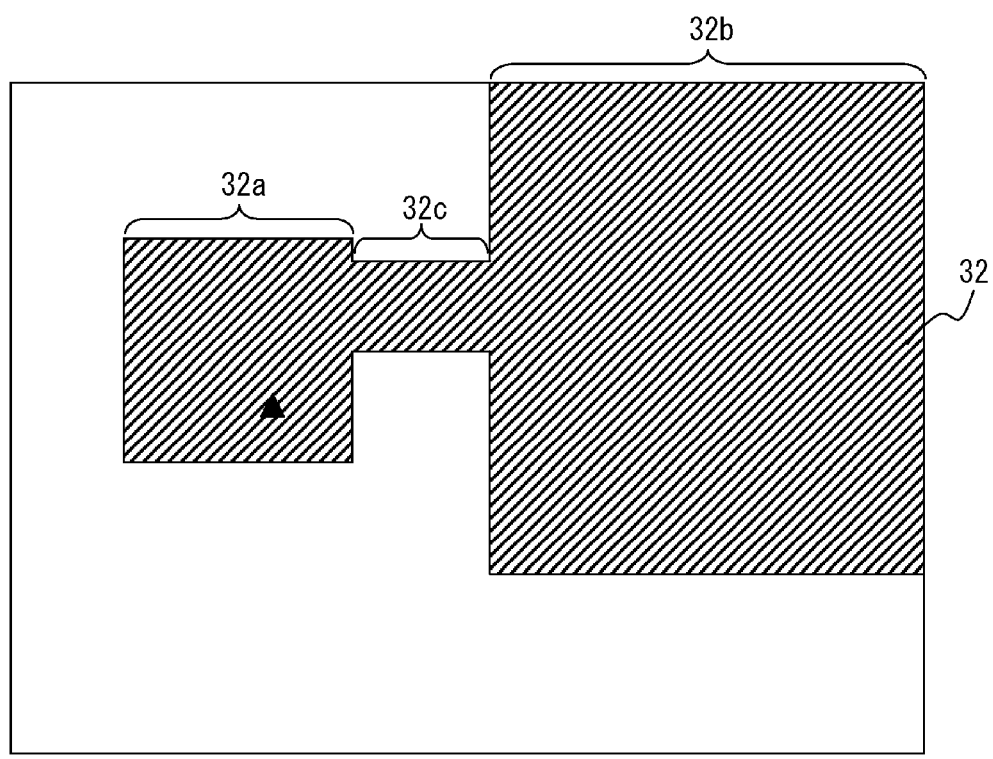
F I G. 4

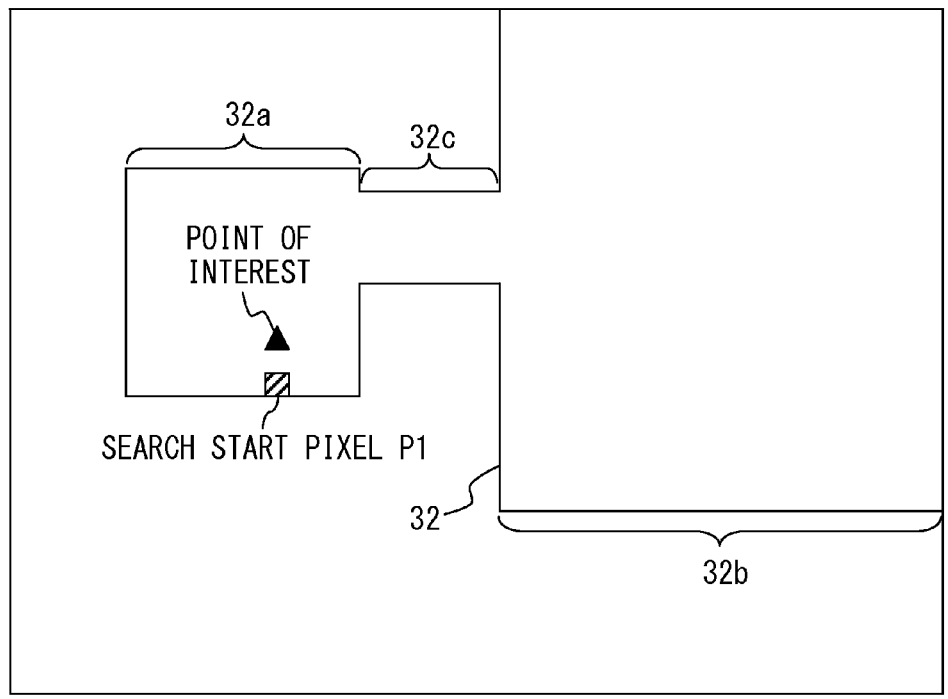
F I G. 5 A

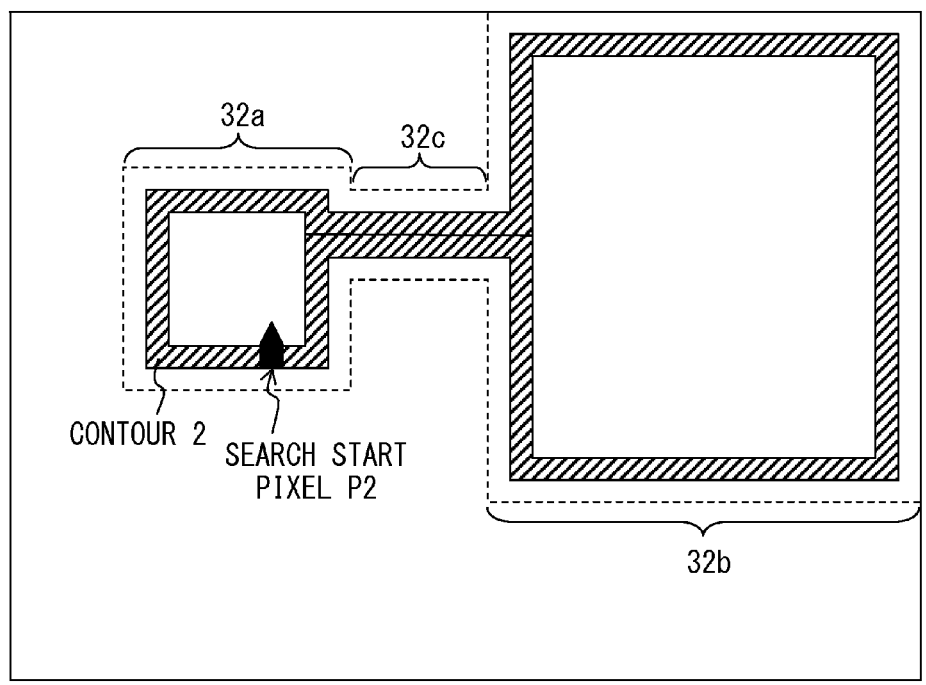
F I G. 5 C

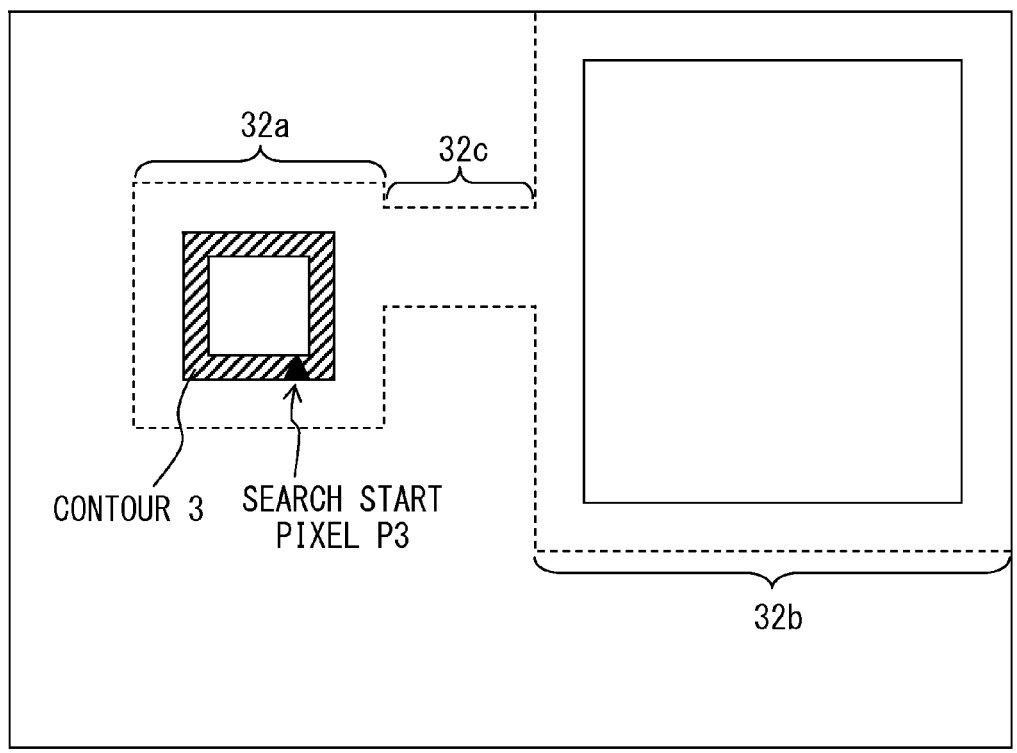
F I G. 5 D

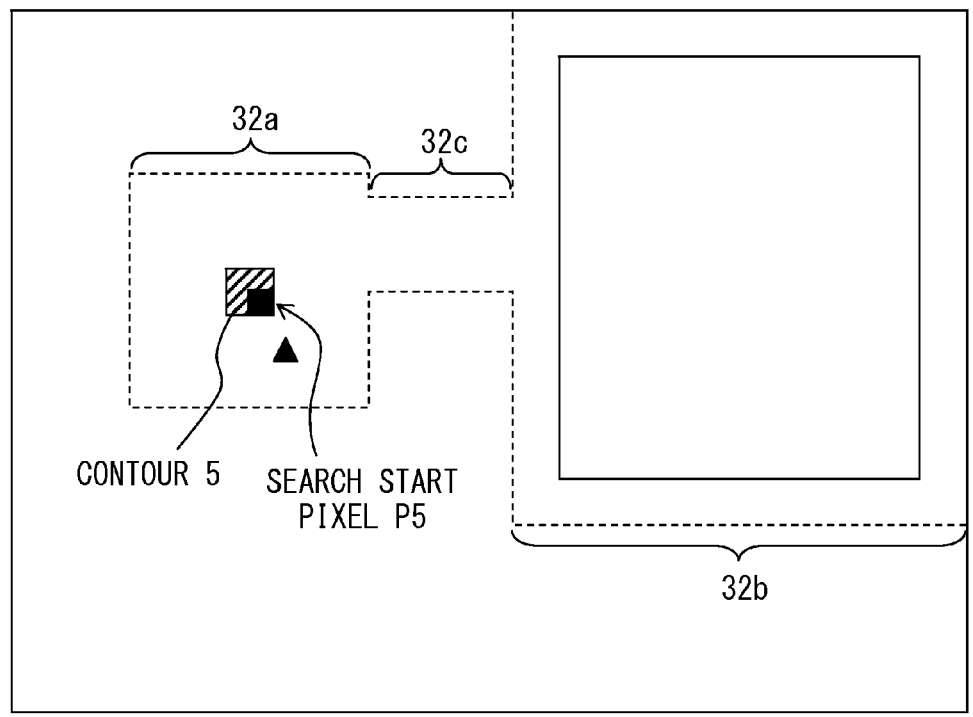
F I G. 5 F

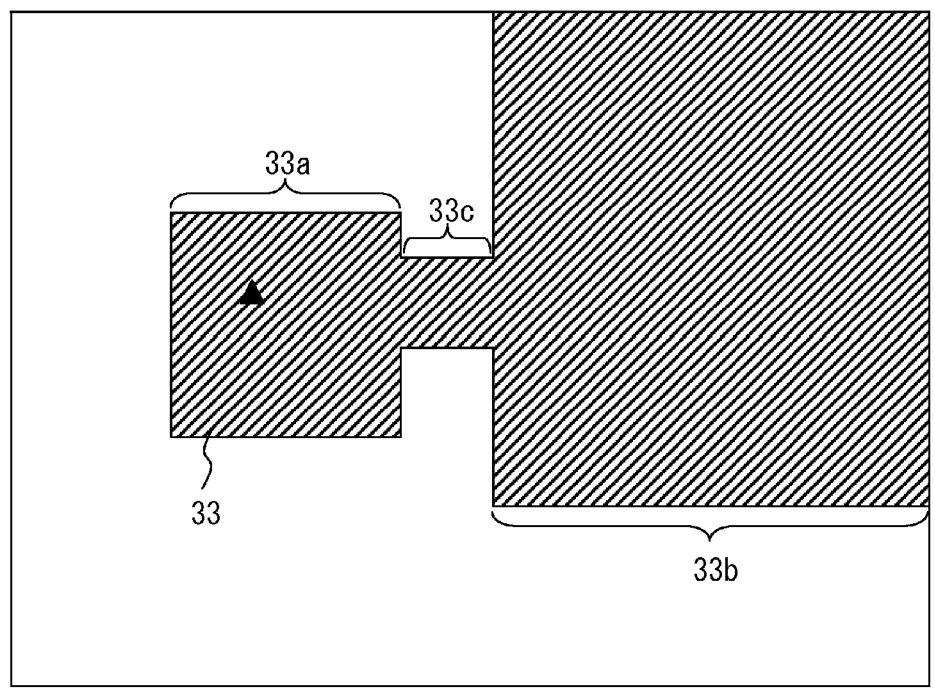
F I G. 6

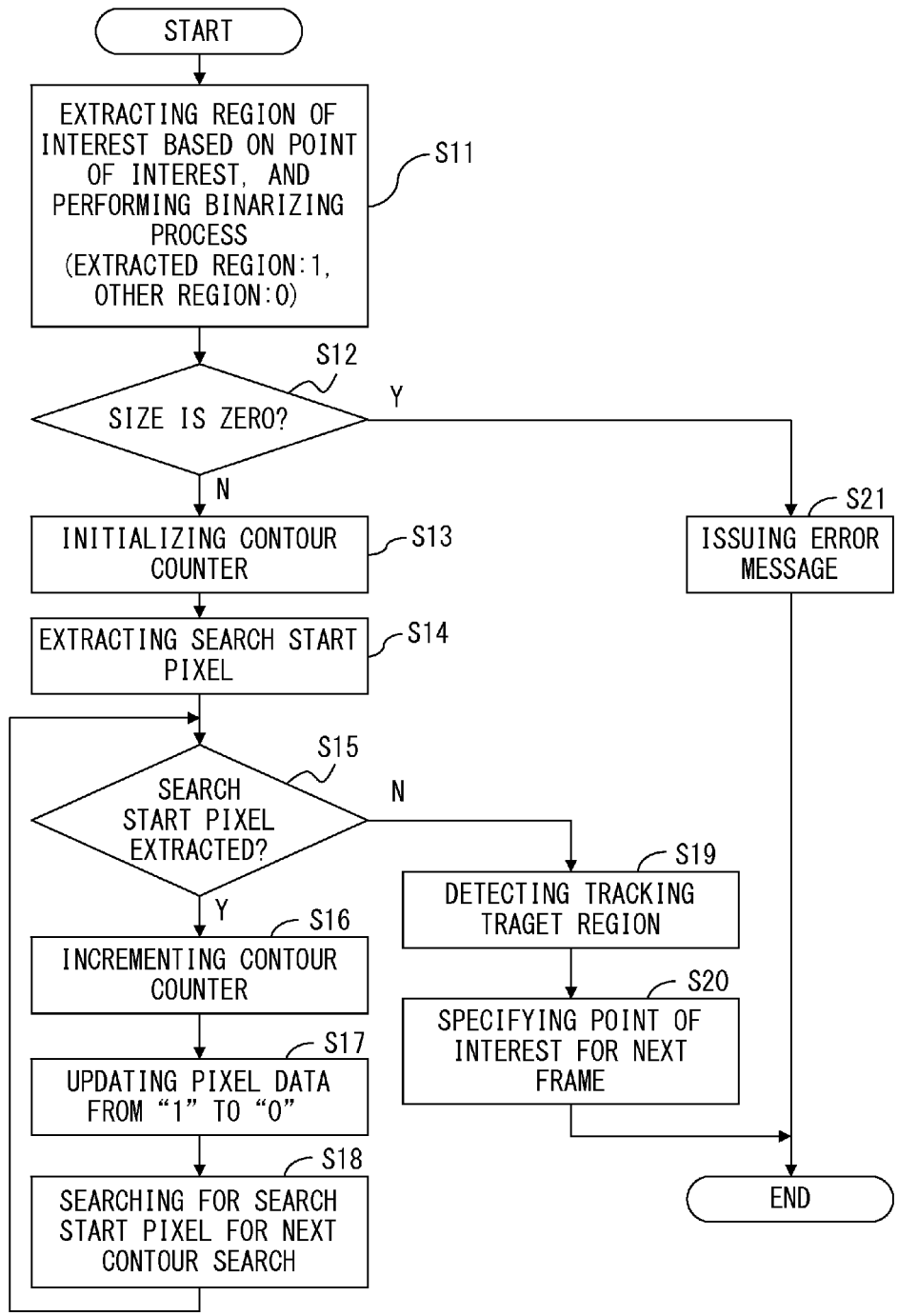
F I G. 7

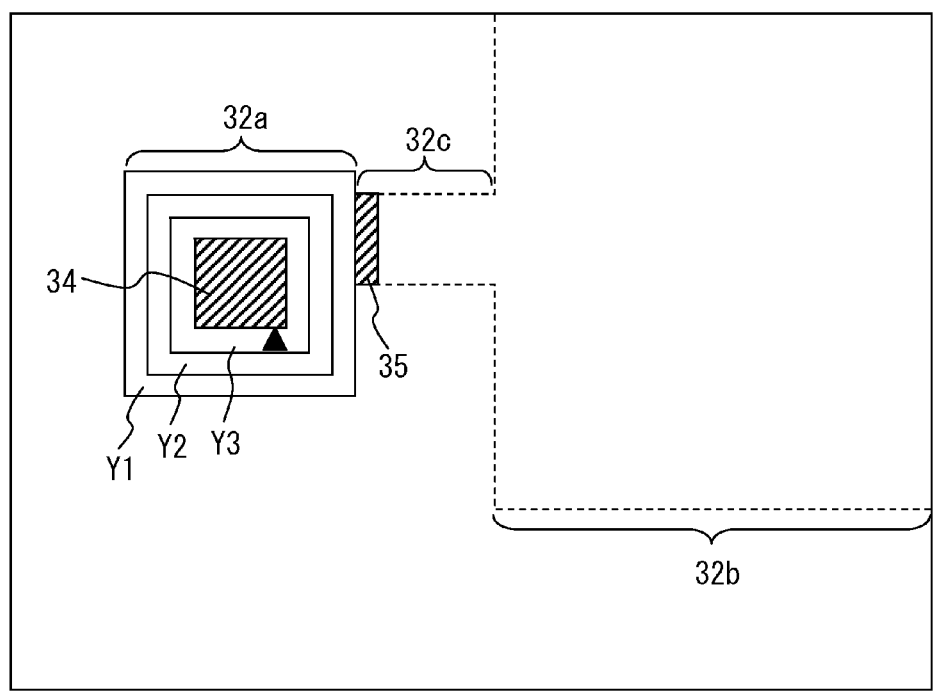
F I G. 8

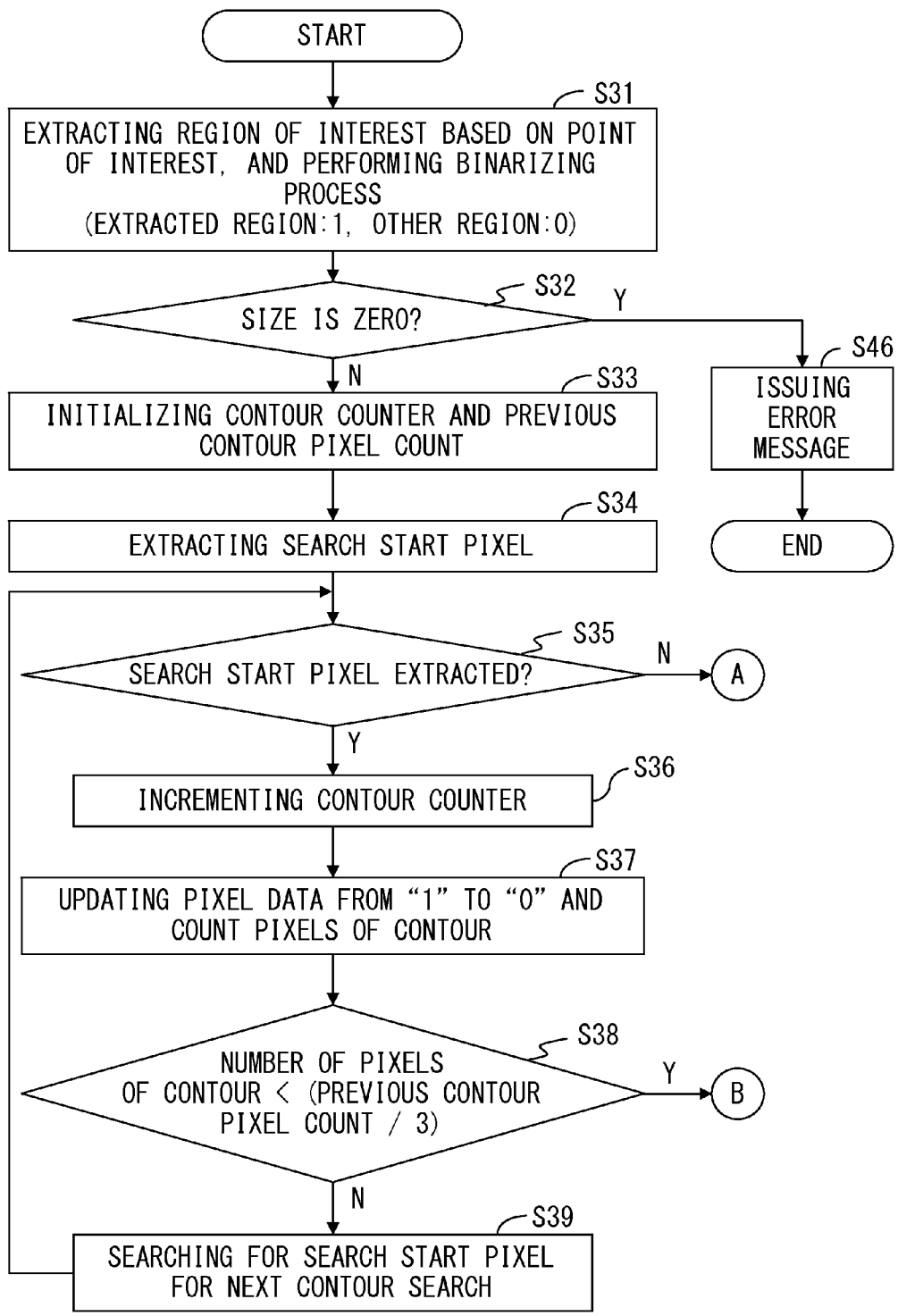
F I G. 9 A

DEVICE AND METHOD FOR IMAGE PROCESSING USED FOR TRACKING PURSUED SUBJECT

CROSS-REFERENCE TO RELATED APPLICATION

This application is a continuation application of International Application PCT/JP2010/057903 filed on May 10, 2010 and designated the U.S., the entire contents of which are incorporated herein by reference.

FIELD

The embodiments described herein are related to an image processing device and an image processing method for processing image data.

BACKGROUND

A digital camera (or an electronic camera) having the function of tracking a moving subject has been known. The digital camera can track the subject and maintain the focus although the subject pursued by a user is moving.

As a related art, a moving region tracking device which stably detects and track a moving region having a plurality of color component regions including achromatic colors. The moving region tracking device includes a moving region detection unit, a color feature extraction unit, a color region reconfiguration unit, a color feature and position information entry unit, a color feature matching moving object detection unit, and a camera control unit. The moving region detection unit detects a plurality of moving regions from a plurality of frames which are captured in different timing in inter-frame difference processing. The color feature extraction unit divides each moving region into small regions, and extracts the color features of the small regions where an area of the moving object is larger than a specified area. The color region reconfiguration unit reconfigures the detected moving region as a moving region formed by a plurality of color regions according to the extracted color features. The color feature and position information entry unit enters the color feature and the position of the reconfigured moving region. The color feature matching moving object detection unit detects a new moving region according to the entered color feature and position, and outputs the moving region to the color feature and position information entry unit. The camera control unit determines the control condition of a CCD camera based on the new moving region, and performs tracking process. (For example, Japanese Laid-open Patent Publication No. 11-136664).

As another related art, a method for separating each granular object in various shapes from an image in which a plurality of granular objects contact one another is known. In this method, an image of a medicine captured by an imaging device is binarized. The digital image analysis and determination unit distributes and arranges a plurality of reference points to the area near the contour of the medicine area in the binary image, and then generates connection lines by connecting a reference point to another reference point so that a combination of reference points as a group includes no connection line passing outside the medicine area. Thus, all reference points correspond to any group, and a reference point group respectively corresponds to an individual area as an image area of the medicine in the binary image, thereby checking a test item of the medicine. (For example, Japanese Laid-open Patent Publication No. 2004-234132)

Another related art, a shape determining method for correctly determining a germ is known. This method extracts the region of a test object to be determined for its shape from a captured image, calculates the contour of the test object, calculates the center line of the test object, detects the bent portion of the test object based on the center line, calculates the thickness of the test object of the region excluding the bent portion according to the contour calculated in the contour calculating step, calculates the average of the thickness, calculates the variance of the thickness, calculates the length of the test object based on the length of the center line, and determines the shape of the test object based on the average of the thickness, the variance of the thickness, and the length of the test object. (For example, Japanese Laid-open Patent Publication No. 2008-298706)

In the conventional technique, when there are a plurality of regions having the identical or similar color component in the image data, there may be a case in which each region is not appropriately recognized. For example, assume that a first subject to be tracked and a second subject not to be tracked are captured by a digital camera. Also assume that the first and second subjects are similar in color to each other. Then, the object tracking device tracks the first subject using the color component of the image data obtained by the digital camera. In this case, when the color regions corresponding to the first and second subjects overlap each other in the image data, one color region is detected and then it is difficult to identify the first subject from the second subject. In addition, when the color regions corresponding to the first and second subjects once overlap each other in the image data and are then separated, the object tracking device may erroneously track the second subject.

In the above-mentioned related techniques, it is assumed that the shape or the size of a subject is known. That is, when the shape of the subject is unknown, there is a case in which a target object is not correctly tracked.

SUMMARY

According to an aspect of the embodiments, an image processing device includes: an extractor configured to extract a region of interest which includes a point of interest and satisfies a specified condition in a first image frame; a divider configured to divide the region of interest into a first subregion including the point of interest and a second subregion not including the point of interest at a narrow portion of the region of interest; and a specifying unit configured to specify a specified pixel in the first subregion as a point of interest of a second image frame.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a configuration of a digital camera including the image processing device according to an embodiment of the invention;

FIG. 3 is a flowchart of an image processing method according to the embodiment;

FIG. 4 illustrates an example of a region of interest extracted by the extractor;

FIGS. 5A through 5G are explanatory views of an example of the object tracking method;

FIG. 6 illustrates an image frame after the image frame in FIGS. 5A through 5G;

FIG. 7 is a flowchart of the image processing method according to the first embodiment;

FIG. 8 illustrates the object tracking according to the second embodiment;

FIGS. 9A and 9B are flowcharts of the image processing method according to the second embodiment.

DESCRIPTION OF EMBODIMENTS

Figure 2:
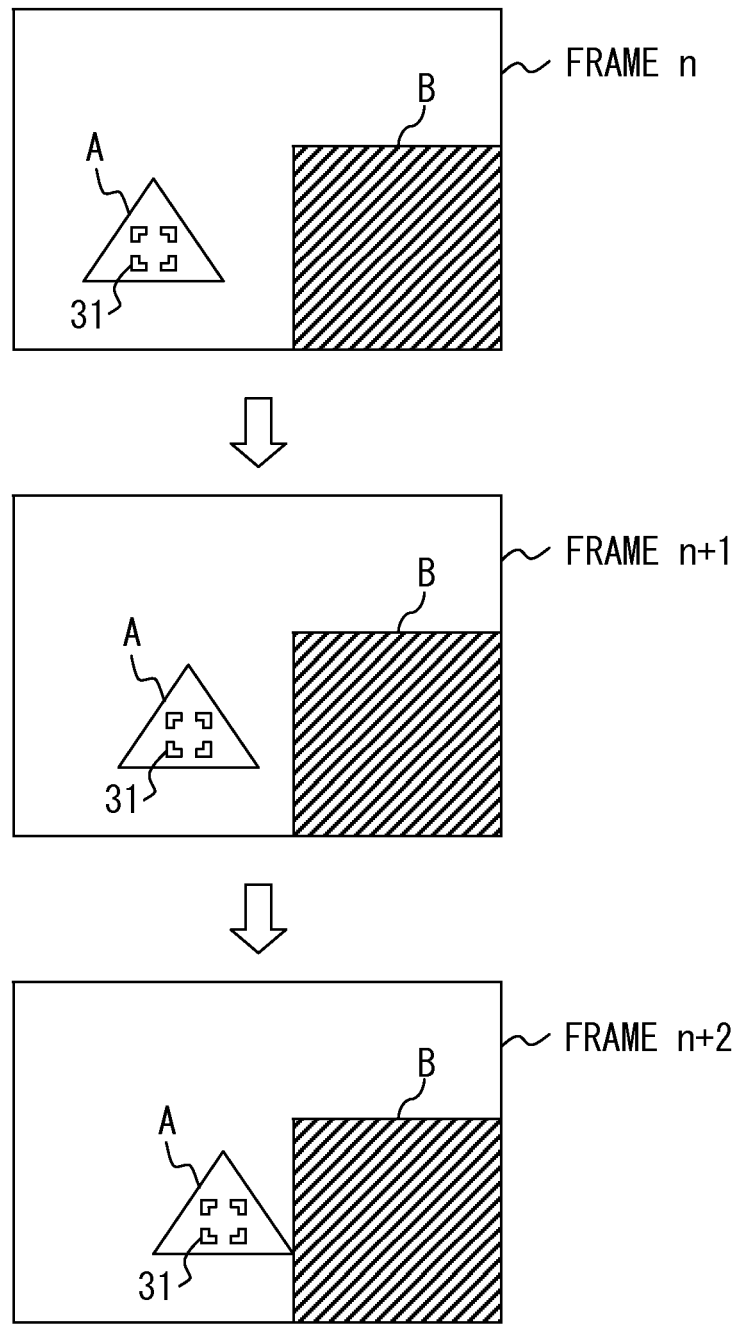
FIG. 2 illustrates the object tracking by a digital camera.

FIG. 1 illustrates a configuration of a digital camera including the image processing device according to an embodiment of the invention. The digital camera (electronic camera) 1 includes an image input unit 11, a controller 12, an object tracking unit 13, and an output unit 14.

The image input unit 11 includes, for example, an image sensor such as a CCD sensor or a CMOS sensor, and generates image data by taking a picture. Here, the image input unit 11 can sequentially generate image data at specified time intervals. In other words, the image input unit 11 can sequentially generate and output image data at different timings. The time intervals is not particularly limited, but is, for example, about 30 frames/second. The image input unit 11 has the function to adjust the focal length according to a focus instruction from the controller 12. Moreover, the image input unit 11 may include image memory which stores image data obtained by the image sensor.

The controller 12 controls the operations of the digital camera 1. The controller 12 starts the object tracking unit 13, and transfers the image data obtained by the image input unit 11 to the object tracking unit 13 to request an object tracking process. Then, the controller 12 sends a focus instruction to the image input unit 11 according to a tracking result given by the object tracking unit 13. In addition, the controller 12 transmits the image data obtained by the image input unit 11 and the tracking result given by the object tracking unit 13 to the output unit 14.

The controller 12 may also perform other control operations. For example, the controller 12 provides a user interface, and controls the operation of the digital camera 1 according to an instruction given by a user. Further, the controller 12 may control the operations of the digital camera 1 by using various kinds of sensors provided for the digital camera 1.

The output unit 14 includes, for example, a liquid crystal display, and displays the image data obtained by the image input unit 11. At this time, the output unit 14 can superimposes the tracking result given by the object tracking unit 13 on the image data obtained by the image input unit 11. Note that the combining process of image data indicating the tracking result and the image data obtained by the image input unit 11 may be performed by either of the controller 12 and the output unit 14. The output unit 14 may provide the function of receiving an instruction from a user with a touch panel device. Although the image data displayed on the output unit 14 is the image data obtained by the image input unit 11, it is not always necessary for the image data to be stored as the image data that is actually obtained by photo shooting. In other words, the output unit 14 may display the image data obtained by the image input unit 11 as a viewfinder image.

The object tracking unit 13 performs an object tracking process by using the image data obtained by the image input unit 11. In other words, the object tracking unit 13 is implemented by an image processing device. This image processing device is realized, for example, by one or a plurality of semiconductor IC chips including a processor that executes an image processing program describing object tracking procedures. Alternatively, the image processing device may be realized by a hardware circuit that performs the object tracking procedure. Further, the image processing device may include hardware and software.

FIG. 2 illustrates the object tracking by the digital camera 1. Here, pictures are taken by the image input unit 11 at times T, T+1, and T+2, and image frames n, n+1, and n+2 are generated. In this case, the output unit 14 sequentially displays the image frames n, n+1, and n+2. On each of the image frames, image regions that cover a subject "A" and an object "B" are formed. In this example, a subject A is a moving object, and an object B is a non-moving object.

It is assumed that a user designates a target subject (a subject that a user wants to focus on) while viewing, for example, an image being displayed on the output unit 14. Here, it is assumed that a user designates the subject A as the target subject. An instruction from a user to designate the subject A is received by the controller 12. In response to the instruction from a user, the controller 12 provides a focus instruction to the image input unit 11. Then, the image input unit 11 takes the next picture with a focal length corresponding to the subject A. In addition, the controller 12 instructs the output unit 14 to display a focus mark. Accordingly, a focus mark 31 is superimposed on the subject A in an image displayed on the output unit 14.

The object tracking unit 13 tracks the subject A designated by a user by using the image data obtained by the image input unit 11. At that time, the object tracking unit 13 detects an image region that covers the subject A in each of the image frames n, n+1, and n+2. Then, a tracking result given by the object tracking unit 13 is sent to the controller 12.

As described above, the controller 12 sends a focus instruction to the image input unit 11 according to a tracking result given by the object tracking unit 13, and notifies the output unit 14 of the tracking result. Accordingly, the image input unit 11 can continue taking pictures with the focus on the subject A being maintained even if the subject A is moving. In an image displayed on the output unit 14, the position at which the focus mark 31 is displayed is controlled according to the movement of the subject A. In other words, as illustrated in FIG. 2, the state in which the focus mark 31 is superimposed on an image region that covers the subject A is maintained.

FIG. 3 is a flowchart of an image processing method according to an embodiment of the invention. The process in the flowchart is performed by the object tracking unit 13. The process in the flowchart is performed for each image frame obtained by the image input unit 11.

In step S1, the region extracting process is performed. That is, the object tracking unit 13 extracts the image region which satisfies a specified condition in the input image frame. The region extracting process may be realized using, for example, a known method.

In step S2, the object region discriminating process is performed. That is, the object tracking unit 13 discriminates the image region of a tracking target object from the image region extracted in step S1.

The region extracting process in step S1 extracts, for example, the image region having a specified color component. Assume that the color components of the image regions corresponding to the subject A and the object B illustrated in FIG. 2 are similar to each other. In this case, in step S1, when the image region corresponding to the subject A is to be extracted, the image region corresponding to the subject A and the image region corresponding to the object B are extracted. Then, the object region discriminating process in step S2 discriminates the image region corresponding to the subject A as a tracking target object from the image region extracted in step S1.

The object tracking unit 13 includes an extractor 21, a divider 22, and a specifying unit 23 to provide the above-mentioned image processing method. In addition, although not illustrated in FIG. 1, the object tracking unit 13 is provided with memory which temporarily stores an image frame, and memory to be used as a work area for image processing by the extractor 21, the divider 22, and the specifying unit 23.

The extractor 21 extracts from the input image frames a region of interest which includes a point of interest and satisfies a specified condition. The point of interest is a pixel (or coordinates) that is designated in the immediately previous image frame, which will be explained later in detail. Note that the initial value of a point of interest is designated, for example, by a user. A user can designate a target subject while viewing an image which is being displayed on the output unit 14. In this case, the center (or barycenter) of an image region that corresponds to the subject designated by a user is used as the initial value of the point of interest.

In this example, the "specified condition" is expressed by a pixel value. The pixel value represents the amount of a certain characteristic of a pixel. As the pixel value, a luminance component and/or a color-difference component may be used, for example. The extractor 32 extracts a pixel that has a pixel value that is the same as or similar to the pixel value at a point of interest. Byway of an example, it is assumed that when the luminance component of a pixel is expressed by 0 to 255, the luminance component of the pixel at a point of interest is "210". In this case, the extractor 32 extracts, for example, a pixel whose luminance component value is between 200 and 220 in the input image frame. By way of another example, it is assumed that when the color component of a pixel is expressed between 0 and 255 for each of RGB, the R-component, G-component, and B-component of the pixel at a point of interest are "100", "140", and "85", respectively. In this case, the extractor 32 extracts, for example, a pixel that satisfies three conditions, that the values of the R-component, G-component, and B-component are respectively within the range of 90 to 110, the range of 130 to 150, and the range of 75 to 95, in the input image frame. By way of still another example, when the color component of a pixel is expressed by the three components of luminance, saturation, and hue, the ranges of the components are determined in a similar manner to the above and a pixel that satisfies the conditions of the determined ranges may be extracted.

At that time, the extractor 21 extracts continuous image regions that include a point of interest. For example, the extractor 21 extracts a region of interest by the following procedures.
(1) The pixel value the pixel at a point of interest is detected.
(2) When the difference between the pixel value of a neighboring pixel (upper, lower, right, left) of a point of interest and the pixel value of the pixel at the point of interest is smaller than a specified threshold, the neighboring pixel is extracted as a pixel that belongs to a region of interest.
(3) An extraction process which is similar to procedure (2) above is performed on neighboring pixels of the pixel extracted in procedure (2) above.
(4) Until a neighboring pixel, the difference between the pixel value of the neighboring pixel and the pixel value of the pixel at a point of interest being smaller than a specified threshold, is no longer detected, the processes in procedures (2) to (3) are executed.

In procedures (1) to (4), a region of continuous pixels having the pixel value similar to that of a pixel at a point of interest (i.e., a region of interest) in the input image frame is extracted. Here, the extraction of a region of interest may be realized by a known method, which does not indicate any limitation in particular.

FIG. 4 illustrates an example of a region of interest extracted by the extractor 21. In FIG. 4, the symbol ▲ indicates a point of interest. The region indicated by diagonal lines refers to a region of interest extracted by the extractor 21. In this example, a region of interest 32 includes a rectangular region 32a including the point of interest, a large rectangular region 32b, and a connection region 32c connecting the rectangular regions 32a and 32b. The width (height in FIG. 4) of the connection region 32c is less than the widths of other regions (that is, the rectangular regions 32a and 32b) of the connection region 32c.

Consider that the subject as a tracking target object moves, and the image region corresponding to the tracking target object approaches and contacts or overlaps the image region corresponding to another object. As an example, in FIG. 2, assume that the color components of the image region corresponding to the subject A and the image region corresponding to the object B are similar to each other. In addition, assume that a point of interest is located in the image region corresponding to the subject A.

In the following explanation, the image region corresponding to the subject A is referred to as an "image region A", and the image region corresponding to the object B is referred to as an "image region B".

In this case, in the image frames n and n+1 illustrated in FIG. 2, the image region A is extracted as a region of interest. That is, since the image regions A and B are separately located from each other, the extractor 21 can extract the image region A without extracting the image region B.

However, in the image frame n+2, the image regions A and B contact each other. The extractor 21 extracts the image regions A and B as a region of interest. In this case, the width of the contact region of the image regions A and B is smaller than the width of another portion of the region of interest (that is, the image region A or B). That is, when there is a region having a narrow width in the region of interest, there is a strong possibility that the region of interest includes an image region corresponding to the tracking target object and an image region corresponding to another object. Furthermore, if this region of interest is divided at a portion having a smaller width, the image region corresponding to the tracking target object is separated from the image region corresponding to another object.

The divider 22 of the object tracking unit 13 divides the image region as described above. That is, the divider 22 divides the region of interest into a first subregion including a point of interest and a second subregion including no point of interest at the narrow portion of the region of interest. For example, when the region of interest 32 illustrated in FIG. 4 is extracted, the "narrow portion of the region of interest" corresponds to the connection region 32c. In this case, the divider 22 divides the region of interest 32 at the connection region 32c, thereby generating the rectangular region 32a and the rectangular region 32b. Thus, the point of interest is located in the rectangular region 32a. In this case, the divider 22 discriminates the rectangular region 32a as an image region corresponding to the tracking target object (or an image region corresponding to a part of the tracking target object). Thus, the divider 22 detects the image region corresponding to the tracking target object in the input image frame. The image region corresponding to the detected tracking target object may be referred to as an "tracking target region".

The specifying unit 23 specifies a specified pixel in the first subregion obtained by the divider 22 as a point of interest of the next image frame. In the example illustrated in FIG. 4, the specifying unit 23 specifies a specified pixel in the rectangular region 32a as a point of interest of the next image frame. In this case, the specifying unit 23 may specify, for example, the central pixel (or the barycenter point pixel) as the point of interest to be used in the image processing for the next image frame Thus, the specifying unit 23 specifies the specified pixel in the tracking target region which is detected in the input image frame as a point of interest to be used in the next image frame. In this case, the image input unit 11 sequentially generates image frames at short time intervals. Therefore, although a subject to be pursued is moving, there is a small difference in position of the image regions of the subject between two consecutive image frames. Therefore, there is a strong possibility that the pixel specified in each image frame as a point of interest for the next image frame is located in the tracking target region in the next image frame.

The object tracking unit 13 performs the above-mentioned process on each image frame. That is, the object tracking unit 13 detects the tracking target region in the input image frame using the point of interest specified by the process on the immediately previous image frame, and specifies the point of interest of the next image frame based on the newly detected tracking target region. Therefore, the object tracking unit 13 can detect the tracking target region in each image frame. That is, a moving object is pursued.

Thus, the object tracking unit 13 detects a tracking target region in each image frame, and notifies the controller 12 of the tracking target region as a tracking result. The object tracking unit 13 is provided with an output function for outputting a tracking result. That is, the output function sequentially notifies the controller 12 of the tracking target region which is detected by the divider 22. By so doing, the controller 12 issues to the image input unit 11a focus instruction for focus on the subject corresponding to the notified tracking target region. Thus, the image input unit 11 can continue the shooting operation while maintaining the focus on the subject although the subject to be pursued is moving.

The method of detecting the tracking target region from the region of interest by the divider 22 of the object tracking unit 13 is not specifically restricted, but some procedures may be considered. Described below are the first and second embodiments of the invention.

First Embodiment

FIGS. 5A through 5G are explanatory views of an example of the object tracking method. In this example, it is assume that the point of interest for the input image frame is specified by the image processing on the immediately previous image frame. The point of interest on the input image frame is expressed by the symbol ▲ in FIG. 5A. In the input image frame, the extractor 21 extracts the region of interest 32. The region of interest 32 is extracted as an image region having the identical or similar color components to the point of interest. In the following explanation, as in FIG. 4, it is assumed that the region of interest 32 is formed by the rectangular regions 32a and 32b, and the connection region 32c.

First, as illustrated in FIG. 5A, the divider 22 extracts a pixel closest to the point of interest on the contour of the region of interest 32. In the following explanation, the extracted pixel is referred to as a "search start pixel". The search start pixel is detected by selecting the end pixel having the shortest distance from the point of interest when the end pixel (that is, the contour pixel) of the region of interest 32 is searched for upward, in the upper right direction, rightward, in the lower right direction, downward, in the lower left direction, leftward, and the upper left direction. In the example in FIG. 5A, the search start pixel P1 is detected.

Figure 5B:
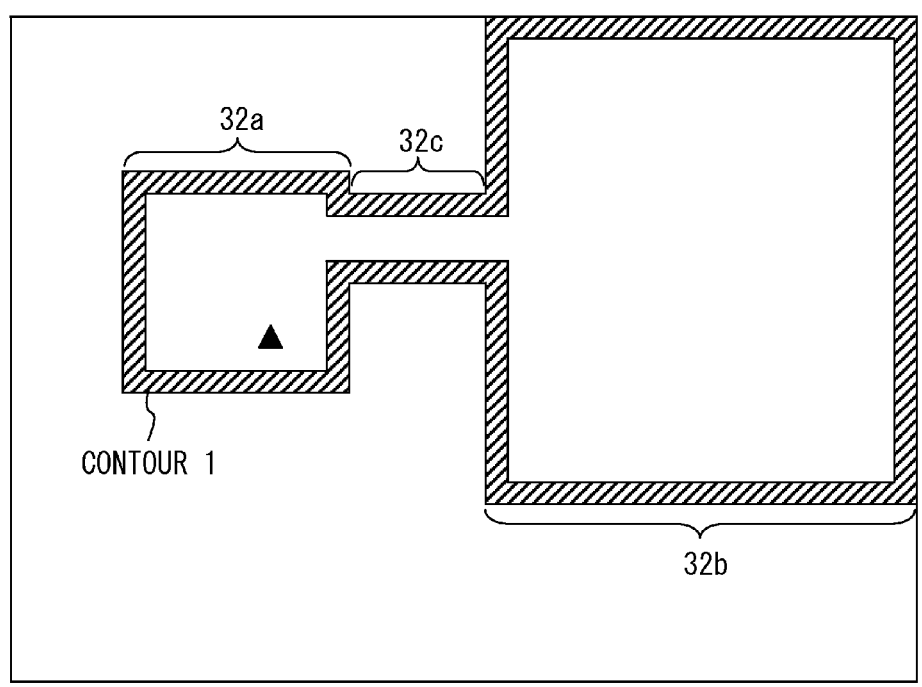

The divider 22 performs a first contour search. That is, the divider 22 extracts each pixel on the contour of the region of interest 32 from the search start pixel P1 as illustrated in FIG. 5B. In this case, the contour search is realized by the route which starts at the search start pixel P1, counterclockwise passes along the periphery of the region of interest 32, and returns to the search start pixel P1. Otherwise, the route may clockwise pass along the outer periphery of the region of interest 32. Thus, the contour of the region of interest 32 is detected. In the following explanation, the contour obtained in the first contour search is referred to as a "contour 1". The contour obtained in the i-th character string may be referred to as a "contour i".

Next, the divider 22 performs a second contour search. That is, the divider 22 extracts each pixel which is adjacent inside the contour 1 as illustrated in FIG. 5B. In this case, a search start pixel P2 is determined in the same method as the first contour search. Otherwise, as the second search start pixel P2, a pixel which is adjacent inside the region of interest 32 as viewed from the search start pixel P1 in the first contour search may be selected. Thus, as illustrated in FIG. 5C, a contour 2 is detected.

Furthermore, the divider 22 performs a third contour search. That is, the divider 22 extracts each pixel which is adjacent inside the contour 2 as illustrated in FIG. 5C. In this case, a search start pixel P3 is determined in, for example, the same method as the second contour search. In this example, as illustrated in 5D, the search start pixel P3 in the third contour search matches the point of interest pixel.

In the third contour search, as described above, each pixel which is adjacent inside the contour 2 illustrated in FIG. 5C is extracted. However, as illustrated in FIG. 5C, the contour 2 from the rectangular region 32a to the rectangular region 32b contacts the contour 2 from the rectangular region 32b to the rectangular region 32a in the connection region 32c, and there is no pixel "inside" the contour 2. Therefore, if the third contour search starts at the search start pixel P3, a contour 3 returns to the search start pixel P3 while extracting the pixels in the rectangular region 32a without extending to the rectangular region 32b as illustrated in FIG. 5D.

Figure 5E:
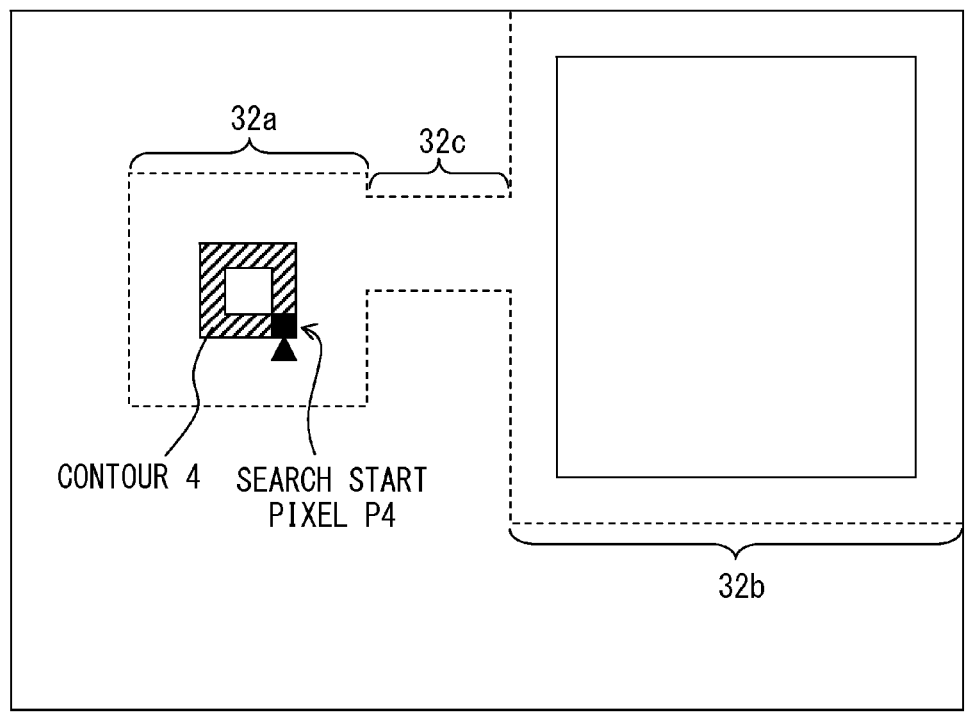

Afterwards, the divider 22 repeatedly performs the above-mentioned contour search until no search start pixel is extracted. That is, the divider 22 extracts each pixel which is adjacent inside the contour 3 illustrated in FIG. 5D. In this example, the fourth contour search is performed from a search start pixel P4 as illustrated in FIG. 5E, and a contour 4 is detected. Furthermore, the divider 22 extracts each pixel which is adjacent inside the contour 4 illustrated in FIG. 5E as a fifth contour search. In this example, a contour search is performed from a search start pixel P5, and a contour 5 is detected.

In this example, no pixel exists "inside" the contour 5 as illustrated in FIG. 5F. Therefore, the divider 22 does not extract a pixel which is adjacent inside the contour 5, or does not extract a search start pixel for the next contour search. Then, the divider 22 terminates the contour search.

Next, the divider 22 generates a tracking target region using the search start pixel in the last contour search as a reference pixel R. In this example, the search start pixel P5 illustrated in FIG. 5F used in the fifth contour search is specified as the reference pixel R. In this case, the reference pixel R corresponds to the representative position coordinates of a tracking target object.

The tracking target region corresponds to the pixel region corresponding to the number of contours obtained in the contour search around the above-mentioned reference pixel R. In the embodiment, the contours 1 through 5 are obtained by the first through fifth contour searches. Therefore, as illustrated in FIG. 5G, a tracking target region is generated by generating peripheral pixel regions X1 through X5 around the reference pixel R as illustrated in FIG. 5G.

The peripheral region X1 is obtained by extracting a pixel adjacent to the reference pixel R. The peripheral region X2 is obtained by extracting a pixel adjacent outside the peripheral region X1. Similarly, the peripheral regions X3, X4, and X5 are respectively obtained by extracting a pixel adjacent outside the peripheral regions X2, X3, and X4.

Figure 5G:
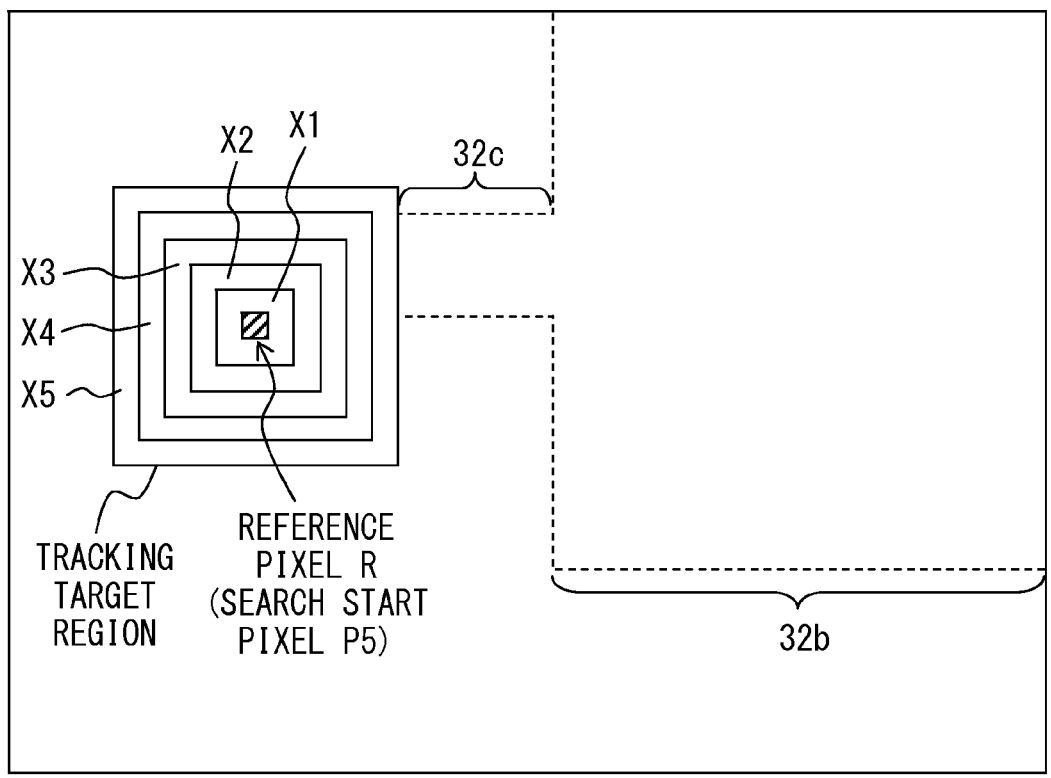

Thus, the divider 22 generates a tracking target region illustrated in FIG. 5G. In this case, the tracking target region matches (or approximately matches) the rectangular region 32*a* as a part of the region of interest 32. Therefore, the process of generating a tracking target region from the region of interest 32 is substantially corresponds to the process of dividing the region of interest 32 into the rectangular region 32*a* and other regions. In other words, the process of generating a tracking target region from the region of interest 32 substantially corresponds to the process of extracting the rectangular region 32*a* from the region of interest 32.

As described above, when a tracking target region is generated, the specifying unit 23 specifies a point of interest for the next image frame. In this case, the specifying unit 23 mat specify the reference pixel R used in generating a tracking target region as the point of interest for the next image frame. That is, the search start pixel P5 for the contour 5 last searched by the divider 22 may be specified as the point of interest for the next image frame.

FIG. 6 illustrates an image frame after the image frame illustrated in FIGS. 5A through 5G. In FIG. 6, the point of interest expressed by the symbol ▲ is located at the same position as the reference pixel R (that is, the search start pixel P5) illustrated in FIG. 5G.

The object tracking unit 13 extracts a region of interest using the point of interest as a reference. In the example illustrated in FIG. 6, a region of interest 33 is extracted. The region of interest 33 is formed by a rectangular region 33*a*, a rectangular region 33*b*, and a connection region 33*c*.

Furthermore, the object tracking unit 13 generates a tracking target region by performing the contour search on the region of interest 33. In this case, the point of interest is located in the rectangular region 33*a*. Therefore, as in the scheme illustrated in FIGS. 5A through 5G, a tracking target region is designated by extracting the rectangular region 33*a* from the region of interest 33.

The rectangular region 33*b* is located at the same position as the rectangular region 32*b* illustrated in FIG. 5A. In this case, the rectangular regions 32*b* and 33*b* are considered to be image regions corresponding to a still object. On the other hand, the rectangular region 33*a* moves toward lower right direction with respect to the rectangular region 32*a* illustrated in FIG. 5A. In this case, the rectangular regions 32*a* and rectangular region 33*a* are considered to be image regions corresponding to a moving object.

Thus, in the image processing method according to the embodiment, as an tracking target region, the rectangular region 32*a* is detected in the image frame illustrated in FIGS. 5A through 5G, and the rectangular region 33*a* is detected in the image frame illustrated in FIG. 6. That is, a moving object is pursued.

Furthermore, according to the image processing method of the embodiment, when the tracking target region overlaps a region corresponding to another object in an image frame, the region of interest is divided at a narrow portion of the region of interest, thereby detecting a tracking target region. Therefore, although a tracking target object is moving, the representative position of the tracking target object and the tracking target region can be stably detected. Furthermore, according to the image processing method of the embodiment, there is no restriction on the size and shape of the tracking target object, and an object of any size and shape may be pursued.

FIG. 7 is a flowchart of the image processing method according to the first embodiment of the invention. The process of the flowchart is performed on each image frame by the object tracking unit 13.

In step S11, the extractor 21 extracts a region of interest based on a specified point of interest. The point of interest of the input image frame is specified by the process in step S20 on the immediately previous image frame. The extractor 21 assigns "1" to each pixel extracted as the region of interest, and assigns "0" to other pixels in the image frame, thereby binarizing the image frame. To the first input image frame immediately after start of the moving object tracking, a point of interest is assigned based on, for example, a user instruction.

In step S12, the extractor 21 detects the size of the region of interest. In this embodiment, the size of the region of interest is detected by counting the number of pixels assigned "1" in the binarized image frame obtained in step S11. When the size of the region of interest is not zero, the process is passed to step S13. On the other hand, when the size of the region of interest is zero, the process is passed to step S21. When the size of the region of interest is smaller than a specified threshold, the process may be passed to step S21.

In step S13, the divider 22 initializes a contour counter. That is, "0" is set to the contour counter. The contour counter is a variable for count of the number of contours detected by the contour search described above with reference to FIGS. 5A through 5F.

In step S14, the divider 22 extracts a pixel closest to the point of interest on the contour of the extracted region of interest as a "search start pixel". In the example illustrated in FIG. 5A, the search start pixel P1 is extracted.

In step S15, the divider 22 determines whether or not the search start pixel has been extracted. Note that when step S15 is executed immediately after step S14, the decision in step S15 is "YES".

In step S16, the divider 22 increments the contour counter. That is, the contour counter is count up by 1. In step S17, the divider 22 executes the contour search for tracing the contour of the region of interest from the search start pixel, and updates the pixel data of each pixel positioned on the contour of the region of interest from "1" to "0". That is, step S17 corresponds to the process of removing a pixel of the periphery end of the region of interest. The search start pixel has been extracted in step S14 or S18.

In step S18, the divider 22 searches for a pixel which is adjacent inside the search start pixel used in the current contour search. Whether or not the corresponding pixel is extracted in this search in step S18 is determined in step S15. When the search start pixel of the next contour search is extracted, the divider 22 performs steps S16 through S18. On the other hand, when the search start pixel of the next contour search is not extracted, the process is passed to step S19.

Thus, the divider 22 searches for the search start pixel of the next contour search every time a contour search is performed. The divider 22 repeatedly performs the processes in steps S16 through S18 until no search start pixel of the next contour search is extracted. During this process, each time the contour search is performed, the contour counter is incremented by one. In the example illustrated in FIGS. 5A through 5F, the search start pixel of the next contour search is not extracted when the fifth contour search is performed. Therefore, in this case, the contour counter counts up to "5".

When the search start pixel of the next contour search is not extracted in the process of steps S15 through S18, the process in step S19 is performed. In step S19, the divider 22 detects a tracking target region around the search start pixel of the last contour search. In this case, the region which expands from the search start pixel upward, in the upper right direction, rightward, in the lower right direction, downward, in the lower left direction, leftward, and the upper left direction by the number of pixels indicated by the contour counter is determined as a tracking target region. In the example illustrated in FIG. 5G, a tracking target region is generated by providing peripheral regions X1 through X5 based on the search start pixel P5 of the fifth contour search.

In step S20, the specifying unit 23 specifies the search start pixel of the last contour search as a point of interest of the next image frame. The point of interest specified in step S20 is used in step S11 to extract a region of interest when the image processing in FIG. 7 is performed on the next image frame.

Step S21 is performed when a region of interest is not appropriately extracted. In step S21, the extractor 21 issues an error message informing that a tracking target region has not been successfully extracted. The error message is transmitted to the controller 12. When the controller 12, for example, receives the error message in the specified number of consecutive image frames, the controller 12 determines that the moving object tracking has failed. In this case, for example, the image input unit 11 stops the automatic focus control, and the output unit 14 stops displaying the focus mark.

Second Embodiment

Also in the image processing method according to the second embodiment, as in the first embodiment, a region of interest is extracted from an input image frame, and the contour is sequentially detected inward from the periphery of the region of interest. In this case, the number of pixels on the contour detected in each contour search is counted.

For example, assume that, as illustrated in FIG. 5A, the region of interest 32 is extracted in the input image frame, and the search start pixel P1 is specified. In this case, the divider 22 detects the contour 1 illustrated in FIG. 5B as in the first embodiment. However, in the second embodiment, the divider 22 counts the number C(1) of pixels of the contour 1. In the embodiment, C(1)=121. The number of pixels of the contour corresponds to the "length" of the contour.

Next, the divider 22 performs the second contour search as with the first embodiment, and detects the contour 2 illustrated in FIG. 5C. In this case, the number C(2) of pixels of the contour 2 is counted. In this embodiment, C(2)=113.

Furthermore, the divider 22 determines whether or not the ratio of the number C(1) of pixels to the number C(2) of pixels exceeds a specified threshold T. That is, it is determined whether or not "C(1)/C(2)>T" or "C(2)<C(1)/T" is satisfied. The threshold T is not specifically restricted, but is "3", for example.

In this embodiment, as described above, C(1)=121, C(2)=113. Therefore, if the threshold T is "3", the condition is not satisfied. In this case, the divider 22 further performs the contour search as with the first embodiment.

The divider 22 performs the third contour search as with the first embodiment, and detects the contour 3 illustrated in FIG. 5D. In this case, the divider 22 counts the number C(3) of pixels of the contour 3. In this embodiment, C(3)=19.

Furthermore, the divider 22 determines whether or not the ratio of the number C(2) of pixels to the number C(3) of pixels exceeds the threshold T. In this embodiment, C(2)=113, C(3)=19. Therefore, if the threshold T is "3", the above-mentioned condition is satisfied. Then, the divider 22 detects the region corresponding to a tracking target object without performing a further contour search.

As described, the divider 22 determines whether or not the ratio of the number C(i−1) of pixels detected in the immediately previous contour search to the number C(i) of pixels detected in current contour search satisfies a specified condition each time the contour i is detected. The meaning of the determination is described as follows.

When the ratio of the number C(i−1) of pixels to the number C(i) of pixels is close to "1", and smaller than the threshold T (=3), the contour i−1 is similar to the contour i. For example, consider the contour 1 illustrated in FIG. 5B and the contour 2 illustrated in FIG. 5C, "C(1)/C(2)" is about 1.07, and is smaller than the threshold T. In this case, the contour 1 and the contour 2 are similar to each other. Specifically, the contour 1 and the contour 2 indicate the shape of the range including both the rectangular regions 32a and 32b.

On the other hand, when the ratio of the number C(i−1) of pixels to the number C(i) of pixels is larger than the threshold T, the contour i−1 and the contour i are rather different. For example, consider the contour 2 illustrated in FIG. 5C and the contour 3 illustrated in FIG. 5D, "C(2)/C(3)" is about 5.95, and is larger than the threshold T. In this case, the contour 2 indicates the shape of the range including both the rectangular regions 32a and 32b. On the other hand, the contour 3 indicates the shape of the rectangular region 32a.

Thus, if "C(i−1)/C(i)" exceeds the threshold T in the procedure of sequentially detecting the contour i inward from the periphery end, it is considered that a part of the region of interest is separated. In the example illustrated in FIGS. 5A through 5D, the rectangular region 32a is extracted from the region of interest 32 with the variable i=3, and the rectangular region 32b is left (or removed). As described, the image processing method according to the second embodiment calculates the ratio "C (i−1)/C(i)" of the number of pixels each time the contour i is detected, and it is decided whether or not a tracking target region has been extracted from the region of interest depending on the ratio.

The threshold T is used to determine whether or not the division of a region of interest is made when the process is transferred from the contour i−1 to the contour i as described above. The case in which a region of interest is not divided and the ratio "C(i−1)/C(i)" indicates the maximum value is, for example, the case illustrated in FIGS. 5E through 5F. In this case, the number C(4) of pixels of the contour 4 illustrated in FIG. 5E is "12", and the number C(5) of pixels of the contour 5 illustrated in FIG. 5F is "4". That is, the ratio C(4)/C(5)=3. Namely, when a region of interest is not divided, the ratio of the number of pixels is 3 or lower. Therefore, if the ratio of the number of pixels exceeds "3", it is considered that a region of interest has been divided.

According to the second embodiment, the threshold T=3 is used for the reason above, but the threshold T may be determined in other methods. For example, the optimum value of the threshold T may be determined by an experiment or a simulation. If the threshold T is very small (that is, the threshold T is close to 1), for example, there is a possibility that it is determined that a region including both the rectangular regions 32a and 32b is one tracking target region. In this case, there is a possibility that a tracking target is transferred from the rectangular region 32a to the rectangular region 32b. On the other hand, if the threshold T is very large, for example, the rectangular region 32a is not extracted in FIGS. 5C through 5D. In this case, there is a possibility that the moving object tracking is not successfully performed.

In addition, for example, as described above, the ratio the number of pixels is close to "1" in the case in which a region of interest is not divided. Therefore, if no division occurs, the change of the ratio when the contour i−1 is transferred to the contour i similarly changes. On the other hand, when a region of interest is divided, the change of the ratio when the contour i−1 to the contour i is different from the change made when no division occurs, that is, the ratio is greatly changed. Thus, the change rate of the ratio "C(i−1)/Ci)" which is obtained for each contour as a result of the detection of a contour inward from the outer periphery of a region of interest is calculated, and it is considered that a division of a region of interest has occurred based on the "i" when the change rage is the maximum. In this case, the highest change rate corresponds to T.

When the ratio of the number of pixels of a contour exceeds the threshold T as described above, the divider 22 extracts a tracking target region depending on the inner region of the last searched contour and the searched number of contours. For example, as in the embodiments illustrated in FIGS. 5A through 5D, it is assumed that the contours 1 through 3 have been searched. In addition, when the contour 3 is searched, it is assumed that the ratio of the number of pixels between the contours 2 and 3 has exceeded the threshold T. In this case, a selected region 34 illustrated in FIG. 8 is obtained inside the last searched contour 3.

Then, the divider 22 generates a tracking target region by forming outer regions Y3, Y2, and Y1 at the periphery of the selected region 34. The outer region Y3 is obtained by extracting the pixels adjacent to the selected region 34. The outer region Y2 is obtained by extracting the pixels adjacent outside the outer region Y3. Similarly, the outer region Y1 is obtained by extracting the pixels adjacent outside the outer region Y2.

In addition, the divider 22 determines the pixel sequence adjacent outside the outer regions Y1 through Y3 in the region of interest 32 as "narrow width portion of the region of interest 32". In the example illustrated in FIG. 8, a cut region 35 adjacent outside the outer region Y1 is determined as "narrow width portion of the region of interest 32"

In this case, the selected region 34 corresponds to the central region of the rectangular region 32a of the region of interest 32. In addition, the outer regions Y1 through Y3 correspond to the contours 1 through 3, respectively. Therefore, the tracking target region formed by the selected region 34 and the outer regions Y1 through Y3 approximately matches the rectangular region 32a.

Furthermore, the divider 22 divides the region of interest 32 at the cut region 35. Thus, the region of interest 32 is divided into the rectangular region 32a (selected region and outer regions Y1 through Y3) and other regions (rectangular region 32b, connection region 32c). The point of interest is located in the rectangular region 32a. Therefore, the divider 22 extracts the rectangular region 32a including the point of interest (selected region 34 and outer regions Y1 through Y3) in the two regions obtained by dividing the region of interest 32 at the cut region 35, as a tracking target region.

Afterwards, the specifying unit 23 specifies the point of interest for the next image frame as with the first embodiment. In this case, the specifying unit 23 specifies the center or the barycenter of the region extracted as the tracking target region, as the point of interest for the next image frame. In the example in FIG. 8, the center or the barycenter of the rectangular region 32a (or the selected region 34) is specified as the point of interest for the next image frame.

Figure 9B:
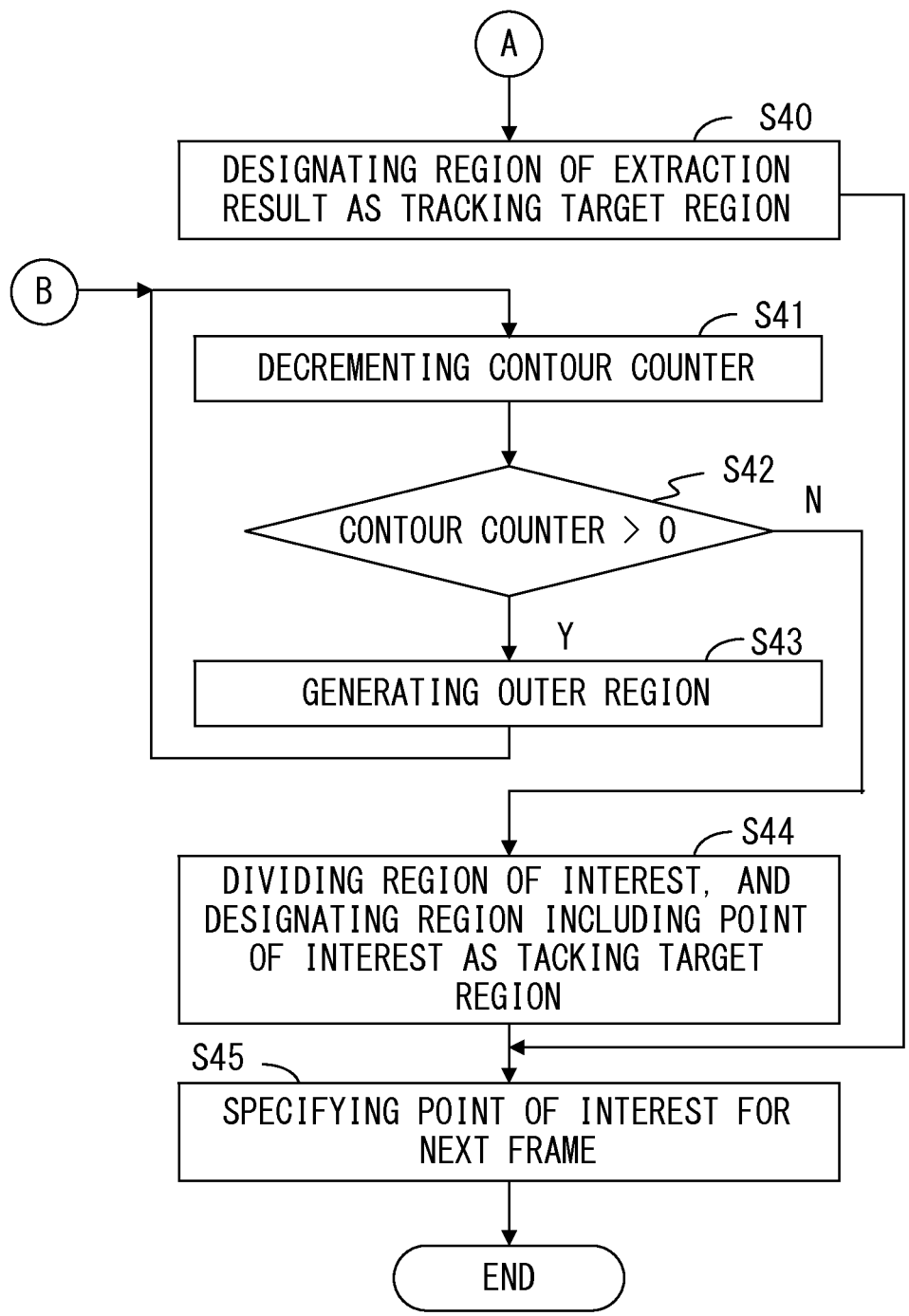

FIGS. 9A and 9B are flowcharts of the image processing method according to the second embodiment of the invention. The process in the flowchart is performed by the object tracking unit 13 on each image frame as in the first embodiment.

Steps S31 through S32 are substantially the same as steps S11 through S12 in the first embodiment. That is, a region of interest is extracted by the extractor 21. In step S33, the divider 22 initializes the contour counter and the "previous contour pixel count". The previous contour pixel count indicates the number of pixels of the contour detected in the previous contour search.

Step S34 is the substantially same as step S14 according to the first embodiment. That is, the search start pixel is extracted.

In steps S35 through S39, the process similar to steps S15 through S18 according to the first embodiment is performed. However, in step S37, the divider 22 updates the pixel data of each pixel positioned on the contour of the region of interest from "1" to "0", and counts the number of pixels of the contour. Furthermore, in step S38, the divider 22 determines whether or not the ratio of the number of pixels of the contour newly counted in step S37 to the previous contour pixel count satisfies a specified condition. The condition used in the embodiment is "number of pixels of the contour< (the previous contour pixel count/3)". When the ratio of the number of pixels satisfies the condition above, the process is passed to step S41. On the other hand, when the ratio of the number of pixels does not satisfy the condition above, the search start pixel of the next contour search is searched for in step S39, and then the process is returned to step S35.

As described, the divider 22 repeatedly performs the processes in steps S35 through S39 until the ratio of the newly counted number of pixels of the current contour to the previous contour pixel count satisfies a specified condition. During this process, each time the contour search is performed, the contour counter is incremented by 1. In the example illustrated in FIGS. 5A through 5D, when the third contour search is performed, the ratio C(2)/C(3) is larger than the threshold T. Therefore, in this case, the contour counter counts up to "3". When the determination is "NO" in step S38, the number of pixels of the contour obtained in the current contour search is set to the previous contour pixel count in order to count the number of pixels of the next contour.

When the determination is "NO" in step S35 without satisfying the above-mentioned condition of the ratio of the newly counted number of pixels of the contour to the previous contour pixel count, then the process is passed to step S40. This situation may occur in the image frame n illustrated in FIG. 2. In the image frame n, the tracking target region (image region A) does not contact another region (image region B) having a similar color component. In this case, when the contours are sequentially searched inward from the outer periphery of the tracking target region, the decrease rate in the number of pixels of the contour is moderate, and the condition in step S38 is not satisfied. In this case, the contour is gradually reduced, and finally no contour start pixel is detected without satisfying the condition in step S38, thereby determining "NO" in step S35. By so doing, the divider 22 determines the region of interest extracted in step S31 as a tracking target region in step S40.

When the decrease rate of the number of pixels of the contour becomes larger than the threshold in the process loop in steps S35 through S39, the processes in steps S41 through S44 are performed. In steps S41 through S43, the divider 22 generates an outer region each time the contour counter counts down until the contour counter indicates zero. In this case, the outer region is generated so that the last searched contour is surrounded by the outer region. In FIGS. 5A through 5D, the contour counter counts up to 3. Therefore, as illustrated in FIG. 8, the outer regions Y1 through Y3 are generated.

In step S44, the divider 22 divides a region of interest at the portion where the last generated outer region contacts. In the example illustrated in FIG. 8, the region of interest 32 is divided by the cut region 35 which contacts the last generated outer region Y1. Then, the divider 22 determines the region including the point of interest as a tracking target region among regions obtained by the division.

In step S45, the specifying unit 23 specifies the point of interest of the next image frame as in the first embodiment. However, the specifying unit 23 according to the second embodiment specifies the center of the region determined as a tracking target region, as the point of interest of the next image frame, in step S44. Note that when the process in step S40 is performed (that is, when the region of interest is not divided), the search start pixel of the last contour search is specified as the point of interest of the next image frame.

When the region of interest is not appropriately extracted (YES in step S32), an error message is issued in step S46 as in step S21 according to the first embodiment <Other Matters>

In the embodiments above, a tracking target object overlaps another object only a little on an image frame, and the tracking target region is extracted by dividing a region of interest at a narrow portion of the region of interest. According to the image processing method of the embodiments, a tracking target region is detected even in the case in which another object having a similar color component does not exist near the tracking target object on the image frame. In this case, for example, in step S40 in FIG. 9B, the entire region of interest is determined as a tracking target region. In addition, when a tracking target object is largely overlaps the other object above on the image frame, a "shadow" exists near the boundaries of them in many cases. Therefore, a different color region is formed at the boundaries of them, and a region of interest becomes narrow between the tracking target region and the region corresponding to the other object. Therefore, although a tracking target object largely overlaps the above-mentioned other object, the tracking target region can be extracted.

Furthermore, the following process may be added to the process of the object tracking unit 13 in the embodiment above. For example, when an image region having a specified color component is extracted in the current image frame, the current image frame may be reduced depending on the size of the region of interest in a previous image frame. Then, the image region having a specified color component may be extracted using the reduced current image frame. By adding the above-mentioned process to the process of extracting an image region by the object tracking unit 13, an image region having a specified color component may be extracted from a smaller image frame, thereby shortening the time taken in the extracting process.

In the embodiments described above, the image processing device according to the embodiments is provided inside the digital camera, but may be provided outside the digital camera. For example, the image processing device according to the embodiments may be provided in the server computer. In this case, the image data output from the digital camera is transferred to the server computer. The server computer performs the object tracking process, and transfers the result back to the digital camera. Then, the digital camera controls, for example, the focal length, according to the tracking result received from the server computer.

<Hardware Configuration>

Figure 10:
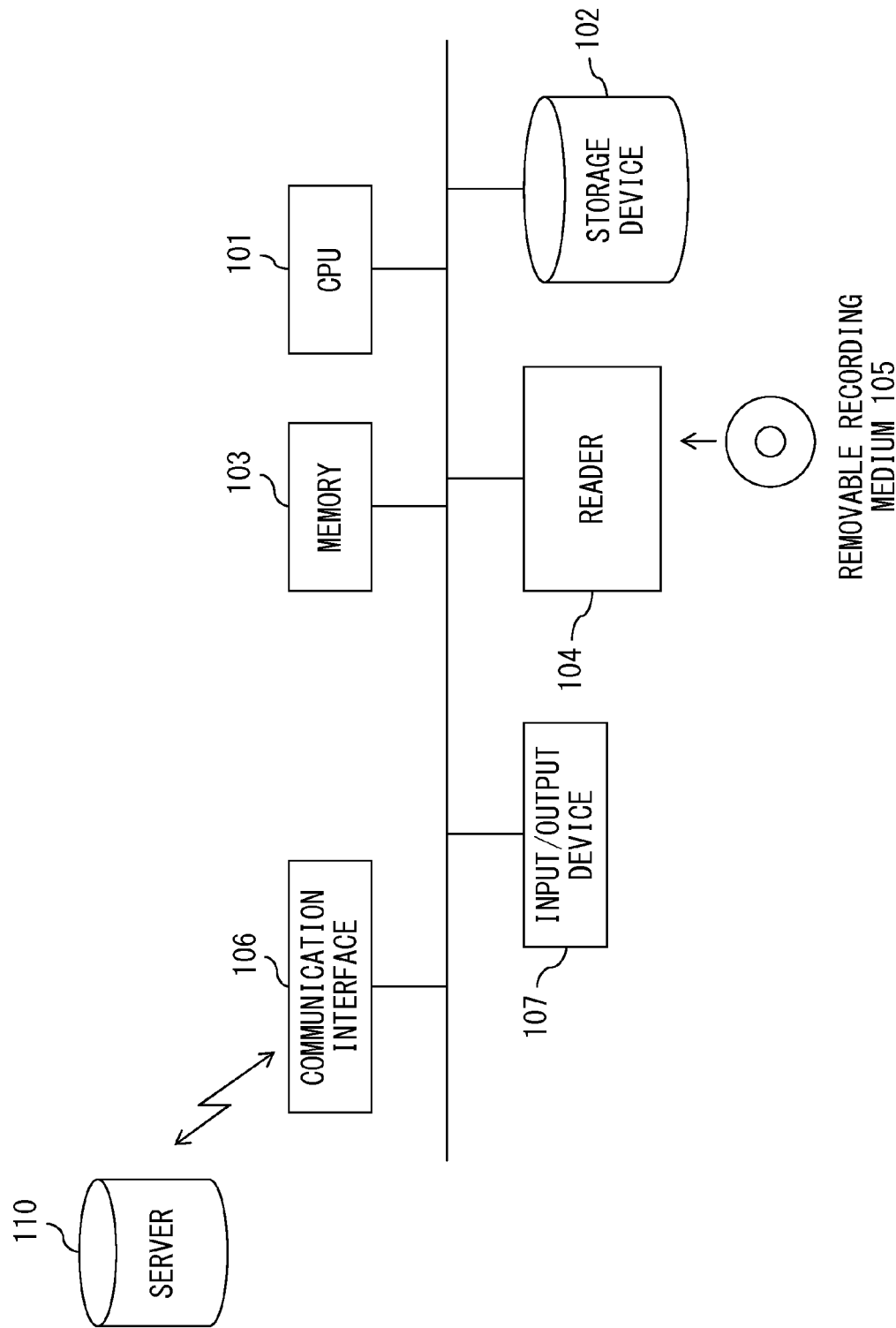
FIG. 10 illustrates a configuration of the hardware of the image processing device according to the embodiments.

FIG. 10 illustrates the hardware configuration of the image processing device according to the embodiments. In FIG. 10, a CPU 101 executes an image processing program by using a memory 103. A storage device 102 stores the image processing program. The storage device 102 may be an external storage device. The memory 103 is, for example, a semiconductor memory, and may include a RAM area and a ROM area. Note that the memory 103 may be used, for example, in order to store an image frame. As described above, the image processing device according to the embodiments is realized by a computer (or a processor system) with a processor and a memory.

A reading device 104 accesses a removable recording medium 105 according to an instruction from the CPU 101. It is assumed that the removable recording medium 105 may be realized by, for example, a semiconductor device, a medium to/from which information is input and output by a magnetic effect, and a medium to/from which information is input and output by an optical effect. A communication interface 106 transmits and receives the data through the network according to an instruction from the CPU 101. An input/output device 107 corresponds to a display device, a device that receives an instruction from a user, or the like in the embodiments. Note that it is not always necessary for the image processing device according to the embodiments to include the communication interface 106 and/or the input/output device 107.

The image processing program according to the embodiments is provided, for example, in the following ways.
(1) Installed in the storage device 102 in advance
(2) Provided by the removable recording medium 105
(3) Downloaded from a program server 110

At least a part of the object tracking unit 13 according to the embodiments (i.e., the extractor 21, the divider 22, and the specifying unit 23) are realized by executing the image processing program in the computer configured as above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An image processing device comprising:
a memory that stores a program; and
a processor that executes the program stored in the memory, wherein
the processor extracts a region of interest which includes a point of interest and satisfies a specified condition in a first image frame,
the processor divides the region of interest into a first subregion including the point of interest and a second subregion not including the point of interest at a narrow portion of the region of interest,
the processor specifies a specified pixel in the first subregion as a point of interest of a second image frame, and
when the processor divides the region of interest into the first subregion and the second subregion, the processor repeatedly executes a contour searching process in one of a clockwise and counterclockwise direction, until a new contour is not searched, wherein
in a first contour searching process, the processor searches an outer contour of the region of interest by extracting each pixel that is located on an edge of the region of interest started from a search start pixel that is determined based on a position of the point of interest and that is located on the edge of the region of interest,
in each of following contour searching processes, the processor searches a next contour by extracting each pixel that is located adjacent inside a previous contour searched in an immediately previous contour searching process with at least a final contour searching process searching the first subregion without extending into the second subregion, and
the processor detects the first subregion based on the position of the search start pixel for a most recently searched contour.

2. The image processing device according to claim 1, wherein the processor detects the first subregion based on the position of the search start pixel for the most recently searched contour and a number of contours searched by the contour searching process.

3. The image processing device according to claim 1, wherein the processor specifies the search start pixel for the most recently searched contour as the point of interest of the second image frame.

4. The image processing device according to claim 1, wherein the processor counts the number of pixels of each contour of the region of interest while contour searching process for searching two or more of the contours in order inward from the edge of the region of interest, each of the contours being searched from a search start pixel depending on the position of the point of interest, and detects the first subregion based on a contour for which a change in the number of pixels satisfies a specified condition.

5. The image processing device according to claim 4, wherein the processor specifies a pixel at a center of an inside region of a contour for which the change of the number of pixels satisfies the specified condition.

6. The image processing device according to claim 1, wherein
the first image frame is generated by shooting by a digital camera at a first shooting time,
the second image frame is generated by shooting by the digital camera at a second shooting time immediately after the first shooting time.

7. A non-transitory computer-readable recording medium having stored therein a program for causing a computer to execute a tracking process for object tracking, the tracking process comprising:
extracting a region of interest which includes a point of interest and satisfies a specified condition in a first image frame;
dividing the region of interest into a first subregion including the point of interest and a second subregion not including the point of interest at a narrow portion of the region of interest; and
specifying a specified pixel in the first subregion as a point of interest of a second image frame, wherein
when dividing the region of interest into the first subregion and the second subregion, the tracking process repeatedly executes a contour searching process in one of a clockwise and counterclockwise direction, until a new contour is not searched, wherein
in a first contour searching process, the tracking process searches an outer contour of the region of interest by extracting each pixel that is located on an edge of the region of interest started from a search start pixel that is determined based on a position of the point of interest and that is located on the edge of the region of interest,
in each of following contour searching processes, the tracking process searches a next contour by extracting each pixel that is located adjacent inside a previous contour searched in an immediately previous contour searching process with at least a final contour searching process searching the first subregion without extending into the second subregion, and
the tracking process detects the first subregion based on the position of the search start pixel for a most recently searched contour.

8. A digital camera comprising:
an image input unit;
a memory that stores a program; and
a processor that executes the program stored in the memory, wherein
the processor extracts a region of interest which includes a point of interest and satisfies a specified condition in a first image frame generated by the image input unit;
the processor divides the region of interest into a first subregion including the point of interest and a second subregion not including the point of interest at a narrow portion of the region of interest;
the processor specifies a specified pixel in the first subregion as a point of interest of a second image frame generated by the image input unit;

the processor controls the image input unit based on the first subregion, and when the processor divides the region of interest into the first subregion and the second subregion, the processor repeatedly executes a contour searching process in one of a clockwise and counterclockwise direction, until a new contour is not searched, wherein in a first contour searching process, the processor searches an outer contour of the region of interest by extracting each pixel that is located on an edge of the region of interest started from a search start pixel that is determined based on a position of the point of interest and that is located on the edge of the region of interest, in each of following contour searching processes, the processor searches a next contour by extracting each pixel that is located adjacent inside a previous contour searched in an immediately previous contour searching process with at least a final contour searching process searching the first subregion without extending into the second subregion, and the processor detects the first subregion based on the position of the search start pixel for a most recently searched contour.

* * * * *